United States Patent
Patimer et al.

(10) Patent No.: US 11,665,171 B2
(45) Date of Patent: *May 30, 2023

(54) SECURE ACCESS TO A CORPORATE WEB APPLICATION WITH TRANSLATION BETWEEN AN INTERNAL ADDRESS AND AN EXTERNAL ADDRESS

(71) Applicant: CA, Inc., San Jose, CA (US)

(72) Inventors: David Patimer, Tel Aviv (IL); Lior Lev-Tov, Tel Aviv (IL); Eldad Rudich, Tel Aviv (IL); Leonid Belkind, Tel Aviv (IL)

(73) Assignee: CA, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,998

(22) Filed: Jul. 13, 2022

(65) Prior Publication Data

US 2022/0345462 A1  Oct. 27, 2022

Related U.S. Application Data

(63) Continuation of application No. 16/591,347, filed on Oct. 2, 2019, now Pat. No. 11,425,134.

(Continued)

(51) Int. Cl.
 *G06F 21/33* (2013.01)
 *H04L 9/40* (2022.01)
 (Continued)

(52) U.S. Cl.
 CPC .......... *H04L 63/102* (2013.01); *G06F 9/452* (2018.02); *G06F 21/305* (2013.01); *G06F 21/33* (2013.01);
 (Continued)

(58) Field of Classification Search
 CPC ....... H04L 63/102; H04L 63/02; H04L 63/20; H04L 63/0272; H04L 63/0428;
 (Continued)

(56) References Cited

U.S. PATENT DOCUMENTS 7,475,420 B1   1/2009 Hernacki
9,578,063 B1   2/2017 Iyer et al.
(Continued)

FOREIGN PATENT DOCUMENTS

AU   2010256694 A1 * 12/2011 ............ F24F 11/30
CA      2867334 A1 * 12/2013 ............ G01N 33/48
WO  WO-2011-126507 A1   10/2011

OTHER PUBLICATIONS

U.S. Appl. No. 16/591,318, Non-Final Office Action, dated Dec. 24, 2021, 37 pages.

(Continued)

*Primary Examiner* — Khanh Q Dinh
(74) *Attorney, Agent, or Firm* — Quarles & Brady LLP (57) ABSTRACT

Secure access to a corporate application with translation between an internal address and an external address. In some embodiments, a method may include receiving, at a secure access cloud point of delivery (PoD), from a client application on a client device, a request to access a corporate web application that is deployed in a corporate datacenter. The method may also include forwarding, from the secure access cloud PoD, to a connector that is also deployed in the corporate datacenter, the request to access the corporate web application. The method may further include brokering, by the connector and the secure access cloud PoD, authentication of a user, authorization of access by the user, and a secure communication session between the client application and the corporate web application by translating (Continued)

between an internal address of the corporate web application and an external address of the corporate web application.

20 Claims, 8 Drawing Sheets

Related U.S. Application Data (60) Provisional application No. 62/832,038, filed on Apr. 10, 2019.

(51) Int. Cl.
*G06F 9/451* (2018.01)
*G06F 21/30* (2013.01)

(52) U.S. Cl.
CPC .......... *H04L 63/02* (2013.01); *H04L 63/0281* (2013.01); *H04L 63/0853* (2013.01); *H04L 63/20* (2013.01); *H04L 63/0272* (2013.01); *H04L 63/0428* (2013.01); *H04L 63/205* (2013.01)

(58) Field of Classification Search
CPC ..... H04L 63/205; G06F 9/452; G06F 21/305; G06F 21/33
See application file for complete search history.

(56) References Cited

U.S. PATENT DOCUMENTS

| | | | |
|---|---|---|---|
| 9,652,341 B1* | 5/2017 | Lewis | G06Q 40/02 |
| 9,813,418 B1 | 11/2017 | Banerjee | |
| 9,813,478 B2 | 11/2017 | Koo et al. | |
| 10,038,726 B2 | 7/2018 | Gaddam et al. | |
| 10,171,484 B2 | 1/2019 | Balasubramanian et al. | |
| 10,284,532 B2 | 5/2019 | Quinlan et al. | |
| 10,397,185 B1 | 8/2019 | Sandholm et al. | |
| 10,425,411 B2 | 9/2019 | Huang | |
| 10,466,933 B1* | 11/2019 | Bysani Venkata Naga | H04L 67/10 |
| 10,644,890 B1* | 5/2020 | Peddada | H04L 9/0894 |
| 10,749,689 B1* | 8/2020 | Peddada | H04L 9/0894 |
| 10,962,136 B2 | 3/2021 | Tolentino | |
| 11,425,134 B1* | 8/2022 | Patimer | G06F 9/452 |
| 11,442,755 B1 | 9/2022 | Patimer et al. | |
| 11,444,925 B1 | 9/2022 | Patimer et al. | |
| 2004/0022237 A1 | 2/2004 | Elliot et al. | |
| 2005/0125083 A1 | 6/2005 | Kiko | |
| 2006/0122861 A1 | 6/2006 | Scott et al. | |
| 2008/0057923 A1* | 3/2008 | Pousti | H04W 12/082 455/414.3 |
| 2008/0146265 A1 | 6/2008 | Valavi | |
| 2010/0174811 A1 | 7/2010 | Musiri et al. | |
| 2012/0226789 A1* | 9/2012 | Ganesan | G06F 9/5061 709/223 |
| 2012/0226799 A1* | 9/2012 | Kapur | G06F 11/3006 709/224 |
| 2013/0332216 A1* | 12/2013 | George | G16H 40/20 455/456.1 |
| 2014/0075031 A1 | 3/2014 | Doering et al. | |
| 2014/0172483 A1 | 6/2014 | Bellers et al. | |
| 2014/0195805 A1 | 7/2014 | Koo et al. | |
| 2014/0317409 A1 | 10/2014 | Bartok et al. | |
| 2014/0366080 A1 | 12/2014 | Gupta et al. | |
| 2015/0030217 A1* | 1/2015 | Wickboldt | G06F 3/0443 382/124 |
| 2015/0036551 A1* | 2/2015 | Pappas | H04W 4/90 370/260 |
| 2016/0103914 A1* | 4/2016 | Im | G06F 16/951 707/770 |
| 2016/0104002 A1* | 4/2016 | Schneider | G06F 16/1865 726/4 |
| 2016/0315836 A1* | 10/2016 | Hill | G06F 21/00 |
| 2016/0378535 A1 | 12/2016 | Oh et al. | |
| 2017/0149733 A1 | 5/2017 | Chastain et al. | |
| 2018/0063164 A1 | 3/2018 | Balasubramanian et al. | |
| 2018/0219736 A1 | 8/2018 | Bugenhagen et al. | |
| 2018/0287864 A1 | 10/2018 | Hockett et al. | |
| 2018/0367557 A1 | 12/2018 | Brown et al. | |
| 2019/0020723 A1 | 1/2019 | Kumar et al. | |
| 2019/0081930 A1 | 3/2019 | Hunt, IV | |
| 2019/0087297 A1* | 3/2019 | Inbaraj | G06F 11/3034 |
| 2019/0190960 A1 | 6/2019 | Amro et al. | |
| 2019/0208009 A1 | 7/2019 | Prabhakaran et al. | |
| 2020/0241926 A1 | 7/2020 | Guim Bernat | |
| 2021/0019194 A1 | 1/2021 | Bahl et al. | |
| 2021/0311655 A1 | 10/2021 | Benjamin et al. | |
| 2022/0006756 A1* | 1/2022 | Ramaswamy | H04L 45/38 |
| 2022/0158924 A1* | 5/2022 | Ramaswamy | H04L 41/22 |

OTHER PUBLICATIONS

U.S. Appl. No. 16/591,335, Non-Final Office Action, dated Nov. 1, 2021, 43 pages.
U.S. Appl. No. 16/591,347, Non-Final Office Action, dated Sep. 2, 2021, 24 pages.
U.S. Appl. No. 16/591,347, Notice of Allowance, dated Jan. 14, 2022, 21 pages.
U.S. Appl. No. 16/591,365, Non-Final Office Action, dated Sep. 23, 2021, 30 pages.
U.S. Appl. No. 16/591,365, Notice of Allowance, dated Mar. 17, 2022, 15 pages.
U.S. Appl. No. 16/591,347, Notice of Allowance, dated Apr. 15, 2022, 148 pages.
U.S. Appl. No. 16/591,335, Notice of Allowance, dated May 12, 2022, 24 pages.
U.S. Appl. No. 16/591,318, Final Office Action, dated Jun. 27, 2022, 43 pages.

* cited by examiner

| Accessed Resource Type | Protocol | Accessing Application | Authentication Schemes |
|---|---|---|---|
| Web Portal / Application | HTTPS | Any Web Browser Supporting HTTPS 1.1 | Session Authentication - SAML, OAUTH2, OpenID Connect, User/Password + MFA |
| REST / SOAP APIs | HTTPS | Any Application Supporting TLS-Based REST/SOAP API Client | OAuth2 |
| SSH Server (Linux / Unix / Windows) | SSH | Any SSH Client | One-Time Token, RSA Keys |
| SCP/SFTP Server | SSH | Any SCP/SFTP Client | One-Time Token, RSA Keys |
| Windows Remote Desktop Servers | RDP Over HTTPS | Any Microsoft Remote Desktop Protocol Client Supporting Remote Desktop Gateways | NTLM, SPNEGO |
| Native Application To Its Dedicated Back-End | TCP Over SSH | Any Native Application Supporting SSH Tunneling Or Any Native Application In Combination With SSH Client Supporting Tunneling | One-Time Token, RSA Keys |

SECURE ACCESS TO A CORPORATE WEB APPLICATION WITH TRANSLATION BETWEEN AN INTERNAL ADDRESS AND AN EXTERNAL ADDRESS

CROSS REFERENCE TO RELATED APPLICATION

This application is a continuation of U.S. patent application Ser. No. 16/591,347, filed Oct. 2, 2019 by David Patimer et al. and titled, "SECURE ACCESS TO A CORPORATE WEB APPLICATION WITH TRANSLATION BETWEEN AN INTERNAL ADDRESS AND AN EXTERNAL ADDRESS", which claims the benefit of U.S. Provisional Application No. 62/832,038, filed Apr. 10, 2019, the entire teachings of which are incorporated herein by reference in their entirety for all purposes.

BACKGROUND

Organizations have traditionally secured their networks using a perimeter-based approach. In a traditional perimeter-based approach to network security, an organization may have a local area network that includes devices hosting corporate network resources (e.g., corporate applications, services, and/or workloads) housed in a well-defined location, such as in the organization's headquarters building or dedicated datacenter. The network may be secured using a traditional security perimeter and firewall that can protect the devices within the network from attack. When a user seeks to use corporate network resources hosted in those locations from their device (e.g., from their mobile device), the user may connect their device to the network from outside the security perimeter by employing software installed on the device, such as virtual private network (VPN) software, to create a secure connection with the network in order to access corporate network resources.

One challenge to a perimeter-based approach to network security is that more and more organizations are moving corporate network resources outside their network perimeters to the cloud. This has resulted in network architectures that are generally cloud-oriented and do not have a traditional network perimeter. For example, more and more organizations utilize corporate network resources that are hosted by multiple third parties, such as Azure, Amazon Web Services (AWS), and Google. Enterprise IT security programs can become complicated and difficult as organizations outsource infrastructure in this manner while remaining responsible for data and users. Further, users increasingly desire to have access to corporate network resources whether on-premises or off-premises, and at any time of day or night, also known as "anytime, anywhere access." However, using traditional network security approaches, such as using VPN software installed on a device, is increasingly burdensome to users in cloud-oriented network architectures.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for secure access to a. corporate application with translation between an internal and external address may be performed, at least in part, by a computer system including one or more processors. The method may include receiving, at a secure access cloud point of delivery (PoD), from a client application on a client device, a request to access a corporate web application that is deployed in a corporate datacenter, the corporate web application having an internal address and an external address. The method may also include forwarding, from the secure access cloud PoD, to a connector that is also deployed in the corporate datacenter, the request to access the corporate web application. The method may further include brokering, by the connector and the secure access cloud PoD, authentication of a user, authorization of access by the user, and a secure communication session between the client application and the corporate web application by translating between the internal address of the corporate web application and the external address of the corporate web application, with no corresponding agent being installed at the client device, and with the client application being unaware that the secure communication session is brokered by the connector and the secure access cloud PoD.

In some embodiments, the translating between the internal address of the corporate web application and the external address of the corporate web application may be performed in request headers by replacing the external address of the corporate web application with the internal address of the corporate web application.

In some embodiments, the translating between the internal address of the corporate web application and the external address of the corporate web application may be performed in request bodies by replacing the external address of the corporate web application with the internal address of the corporate web application.

In some embodiments, the translating between the internal address of the corporate web application and the external address of the corporate web application may be performed in response headers by replacing the internal address of the corporate web application with the external address of the corporate web application.

In some embodiments, the translating between the internal address of the corporate web application and the external address of the corporate web application may be performed in response bodies by replacing the internal address of the corporate web application with the external address of the corporate web application.

In some embodiments, the translating between the internal address of the corporate web application and the external address of the corporate web application may be completely transparent to the client application.

In some embodiments, the translating between the internal address of the corporate web application and the external address of the corporate web application may be completely transparent to the corporate web application.

in some embodiments, the translating between the internal address of the corporate web application and the external address of the corporate web application may be performed automatically.

In some embodiments, the translating between the internal address of the corporate web application and the external address of the corporate web application may be performed on a chunked stream. In these embodiments, the translating between the internal address of the corporate web application and the external address of the corporate web application performed on the chunked stream may employ a virtual window of content with searches and replaces of the internal address and the external address being performed while reconstructing chunks in the chunked stream.

In some embodiments, the brokering of the secure communication session between the client application and the first corporate web application may include linking to a second corporate web application that is referenced by an internal domain of the second corporate web application in the first corporate web application.

In some embodiments, the linking to the second corporate web application that is referenced by the internal domain of the second corporate web application in the first corporate web application lay include automatically translating the internal domain of the second corporate web application to an eternal domain of the second corporate web application in response headers and bodies.

In some embodiments, the linking to the second corporate web application that is referenced by the internal domain of the second corporate web application in the first corporate web application may include automatically translating the internal domain of the second corporate web application to an external domain of the second corporate web application in request headers and bodies.

In some embodiments, access permissions to both the first corporate web application and the second corporate web application may be aligned.

In some embodiments, the linking to the second corporate web application that is referenced by the internal domain of the second corporate web application in the first corporate web application may include automatically masking the existence of the second corporate web application from the client application. In these embodiments, the automatically masking the existence of the second corporate web application from the client application may include generating, by the secure access cloud PoD, ad-hoc Unique Resource Identifiers (URIs) for the second corporate web application that appear to the client application to correspond to the first corporate web application. In these embodiments, the URIs may appear in content and/or metadata delivered to the client application. In these embodiments, the automatically masking the existence of the second corporate web application from the client application may be completely transparent to the client application.

In some embodiments, one or more non-transitory computer-readable media may include one or more computer-readable instructions that, when executed by one or more processors of a computer system, cause the computer system to perform a method for secure access to a corporate web application with translation between an internal and external address.

In some embodiments, a computer system may include one or more processors and one or more non-transitory computer-readable media. The one or more non-transitory computer-readable media may include one or more computer-readable instructions that, when executed by the one or more processors, cause the computer system to perform a method for secure access to a corporate web application with translation between an internal and external address.

It is to be understood that both the foregoing summary and the following detailed description explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Traditional perimeter-based approaches to network security have required users who desire to access corporate network resources (e.g., corporate applications, services, and/or workloads) to do so using a device that is either located within a secure perimeter of a network or that is connected to the network using software installed on the device, such as virtual private network (VPN) software. While users increasingly desire to have "anytime, anywhere access" to corporate network resources, using traditional network security approaches, such as using VPN software installed on a device, is increasingly burdensome to users in cloud-oriented network. architectures.

The embodiments disclosed herein may provide various benefits. In particular, the embodiments disclosed. herein may, for example, enable secure access to corporate network. resources (e.g., corporate applications, services, and/ or workloads) located in a variety of environments, such as self-hosted datacenters, co-location/hosting, Infrastructure-as-a-Service, Platform-as-a-Service, Software-as-a-Service and more. For example, embodiments disclosed. herein may enable organizations to secure their networks without requiring devices to connect to the network within a traditional security perimeter and without requiring devices to connect to the network by installing software on the devices, such as VPN software. Instead, embodiments disclosed herein may enable organizations to have network architectures that are generally cloud-oriented and that are inside or outside a traditional network perimeter, as well as enabling organizations to utilize network resources that are hosted by multiple third parties such as Azure, AWS, and Google, all while enabling users to have "anytime, anywhere access" to network resources.

Figure 1:
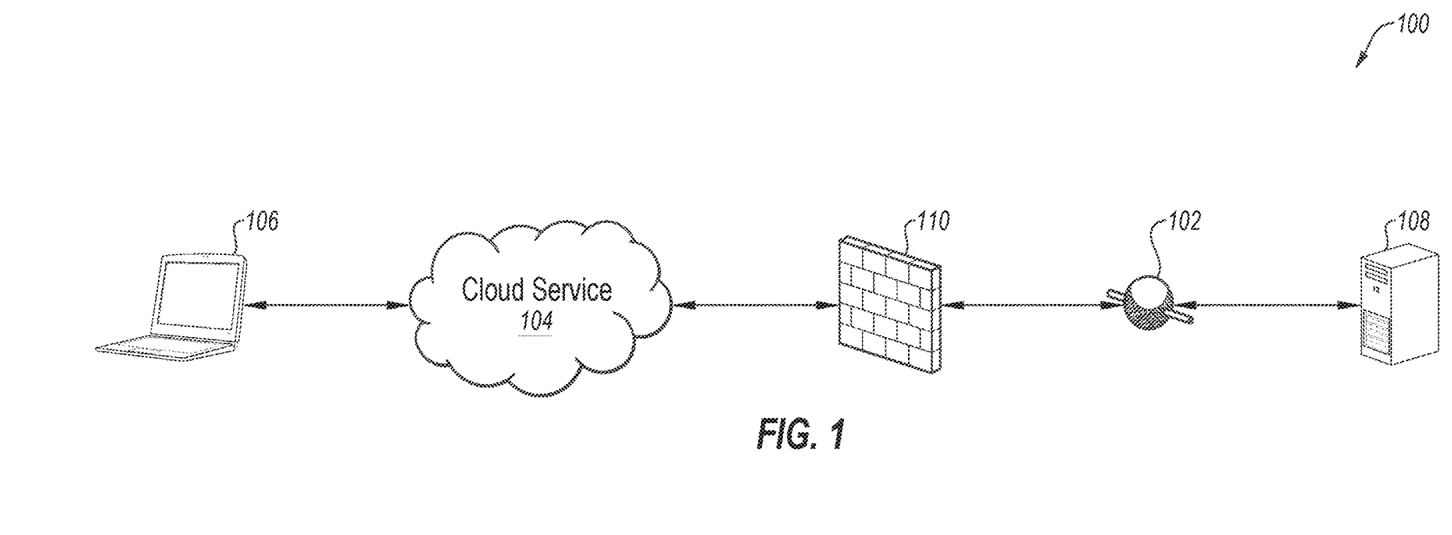
FIG. 1 illustrates an example system configured for providing secure access to corporate network resources.

Turning to the FIGS., FIG. 1 illustrates an example system 100 configured for providing secure access to corporate network resources. Some embodiments may include an example Software as a Service (SaaS) platform, that may allow corporate information technology (IT) organizations to provide secure connectivity to corporate applications and services for designated audiences. The SaaS platform may provide this secure connectivity without exposing internal networks/datacenters to risks associated with network access, and may provide visibility and governance into activities that are performed by the accessing parties.

As disclosed in FIG. 1, the SaaS platform may be configured to provide access by including a connector 102 deployed inside (e.g., behind a firewall 110 of) the corporate datacenter (which may be physical or virtual) that is configured to reach out to a cloud service 104 Point of Delivery (PoD) and configured to wait for requests from authorized/ authenticated users for resources. The user at their device 106 (e.g., their workstation or mobile device) may run any kind of client application (e.g., a web browser, a Secure Shell (SSU) client, a Remote Desktop Protocol (RDP) client, a database workbench, etc.) and may then connect to a particular corporate resource 108 by name (e.g., myresource.mycompany.com). The client application may then connect to the cloud service 104 (where the Domain Name System (DNS) record points) and the cloud service 104 may handle the authenticating of the user, the authorizing of the access (as well as taking additional steps), and the brokering of the connectivity (e.g., via Layer 7) to the actual resource.

Figure 2:
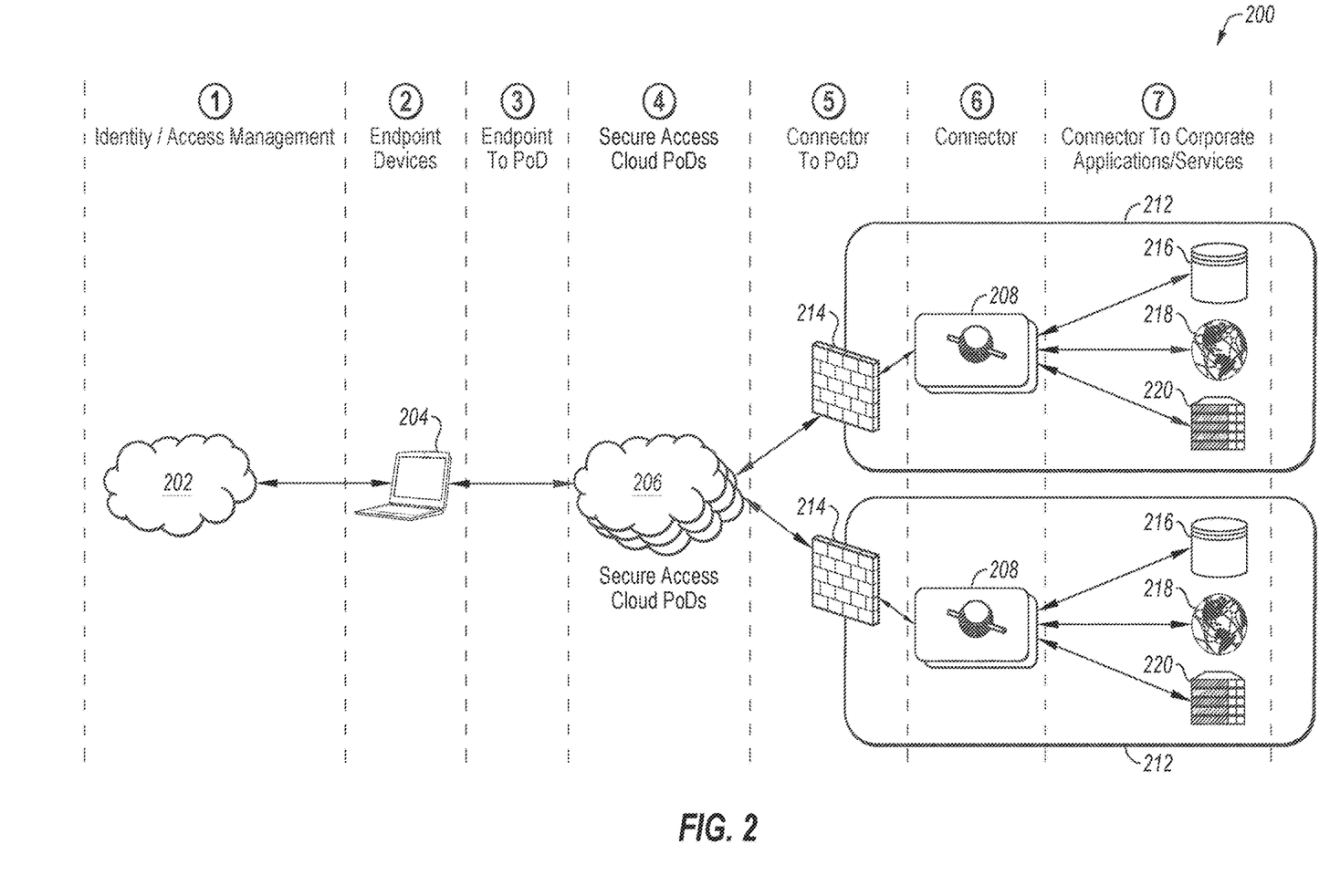
FIG. 2 illustrates another example system configured for providing secure access to corporate network resources.

FIG. 2. illustrates another example system 200 configured for providing secure access to corporate network resources. More particularly, FIG. 2 illustrates various layers of the SaaS platform disclosed herein.

Layer 1 of FIG. 2 is an identity/access management layer. Some enterprise solutions may be deployed either as an Identity as a Service (IDaaS) or on a corporate premises. The SaaS platform disclosed herein may be configured to integrate with any Security Assertion Markup Language (SAW), OpenID Connect/OAuth2 provider, as well as with dedicated on-premises deployments of Microsoft Active Directory and other Lightweight Directory Access Protocol (LDAP)-based identity solutions. For example, the SaaS platform disclosed herein may support any of the following authentication methods 202 for end-users and administrators:

Microsoft Azure Active Directory—can support Microsoft Azure Active Directory using Azure AD Connect synchronization, and can also be used in combination with Active Directory Federation Services (ADFS) to authenticate via an on-premises infrastructure.

Microsoft Active Directory—may involve either installing an on-premises agent for synchronization and pass-through authentication or using ADFS, in which case the on-premises agent may only be used for users/groups synchronization.

Okta—can support various Directory Services using dedicated Okta. Connectors.

OneLogin—can support various Directory Services using dedicated OneLogin Connectors.

Google GSuite.

Authentication via OAuth2/Opent13 Connect or SAML protocols with external Identity Providers (IdPs).

Internal Users Database.

The authentication methods 202 may provide access to an Administrative Portal, a User Portal, and applications and services delivered through the SaaS platform. When accessing SSH servers via the SaaS platform, or when connecting to native applications with SSH tunneling, the SaaS platform may support the following authentication methods 202 for SSH sessions (which may not replace the corporate identity services above, but may serve as a bridge to a corporate identity of the accessing party, as governed by the identity providers):

Temporary Access Token (generated from the User Portal upon successful authentication using any of the above methods).

Using a Rivest-Shamir-Adlem.an (RSA) Key generated in the User Portal.

Layer 2 of FIG. 2 is an endpoint devices layer. The SaaS platform disclosed herein. may be a client-less solution, capable of providing secure access/connectivity from any endpoint device 204, such as any personal computer (PC) platform (e.g., Windows, Mac OS X, or Linux) or any mobile platform (e.g., iOS, Android, etc.), as well as from dedicated embedded or thin-client platforms Chromebook, etc.). This secure access/connectivity may be delivered using the standard applications including, but not limited to, web browsers, SSH clients, RDP clients, service-2-service API access, as well as dedicated applications for accessing databases, data warehouses, and other special repositories. To ensure that access to sensitive corporate resources is performed only from compliant devices, the SaaS platform can integrate with Endpoint Threat Detection and Response (EDR), Mobile Device Management, and Device Security Posture management solutions.

Figure 3:
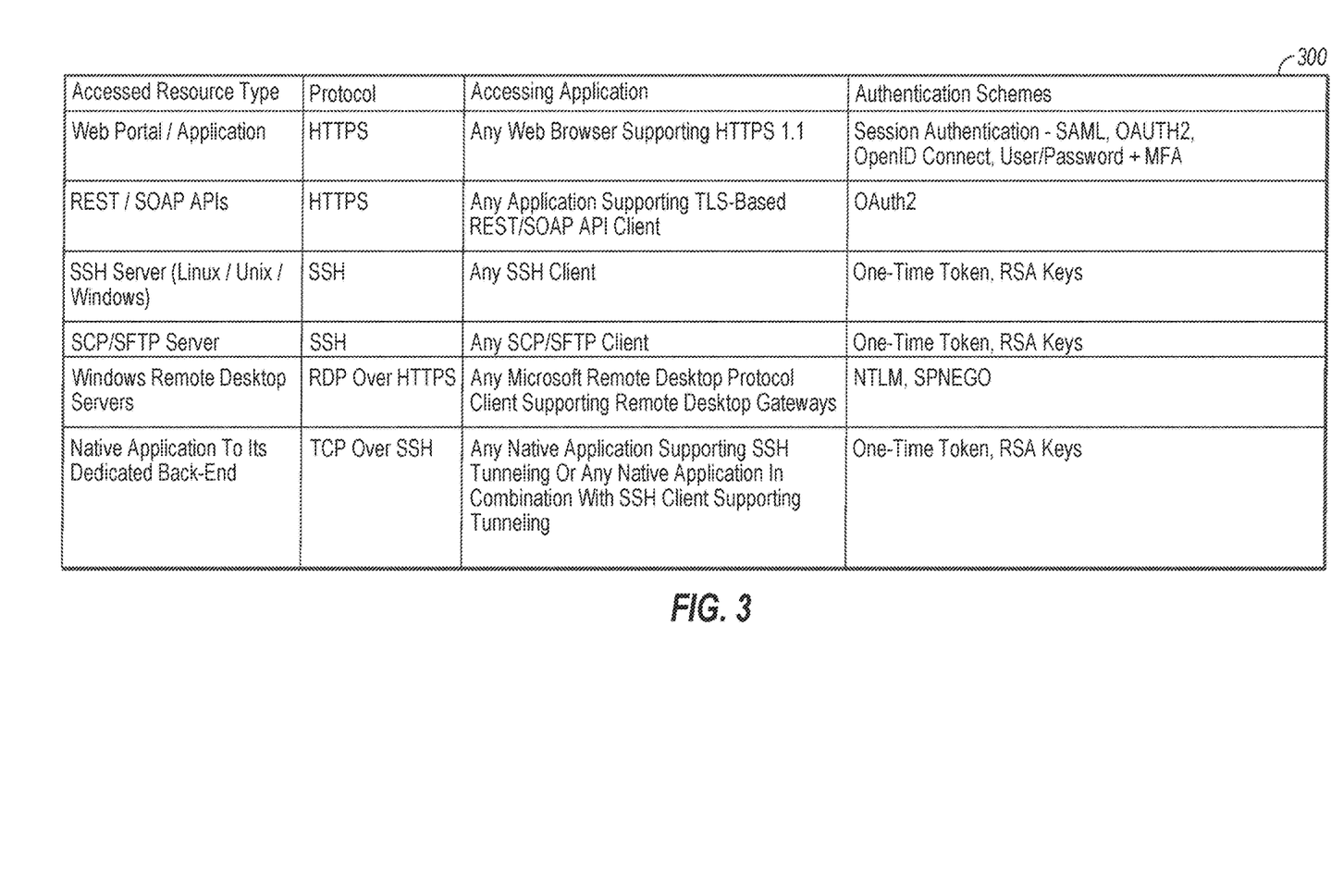
FIG. 3 is a table summarizing various supported connectivity scenarios and authentication schemes.

Layer 3 of FIG. 2 is a connectivity layer. The connectivity between applications running on users' endpoints and the SaaS platform disclosed herein (referred to in FIG. 2 as the secure access cloud PoDs 206) nay be accomplished over point-to-point secure connections, using Transport Layer Security (TLS) 1.2 for example. The SaaS platform either may provide automatically-generated TLS certificates or may integrate with existing corporate Public Key Infrastructure (PM) to generate them. FIG. 3 is a table 300 summarizing various supported connectivity scenarios and authentication schemes. However, the SaaS platform disclosed herein is not limited to supporting only the protocols disclosed in the table 300 of FIG. 3. Instead, any point-to-point Transmission Control Protocol (TCP) connection, point-to-point protocols based on UDP, such as QUIC or upcoming HTTP/3, as well as dedicated TCP protocols (e.g., over TCP Port xyz), may be supported, among others.

Layer 4 of FIG. 2 is a secure access cloud PoDs layer. The secure access cloud PoDs 206 may be deployed in resilient and scalable Infrastructure as a Service (IaaS) datacenters hosted, for example, by AWS and Microsoft Azure. The secure access cloud PoDs 206 may also be deployed on bare:-metal or hosting facilities, limiting their scalability to the resources provided by the specific facility. Each of the secure access cloud PoDs 206 may be deployed as immutable infrastructure, isolated from all other networks managed by the SaaS platform disclosed herein. The secure access cloud PoDs 206 and the service operations may be subject to continuous internal and external audits arae1 reports and certifications, such as, but not limited to:

AICPA SSAE 18 SOC 2 Type II Report

ISO 27001 Certification

FedRAMP Certification

AWS Well Architected Review/Report.

Penetration tests performed by third party organizations

Transparency in observability of operational practices, uptime statistics and other parameters of the secure access cloud PoDs 206 may be a desirable feature of the platform.

The SaaS platform disclosed herein may deploy numerous management, and security solutions to ensnare uninterrupted service for customers, including protection from advanced attacks, including Distributed Denial of Service (DDoS) attacks. Further, the SaaS platform disclosed herein may be designed to ensure uninterrupted access for end-users when a deployment/upgrade is performed using a "draining" technique.

Figure 4:
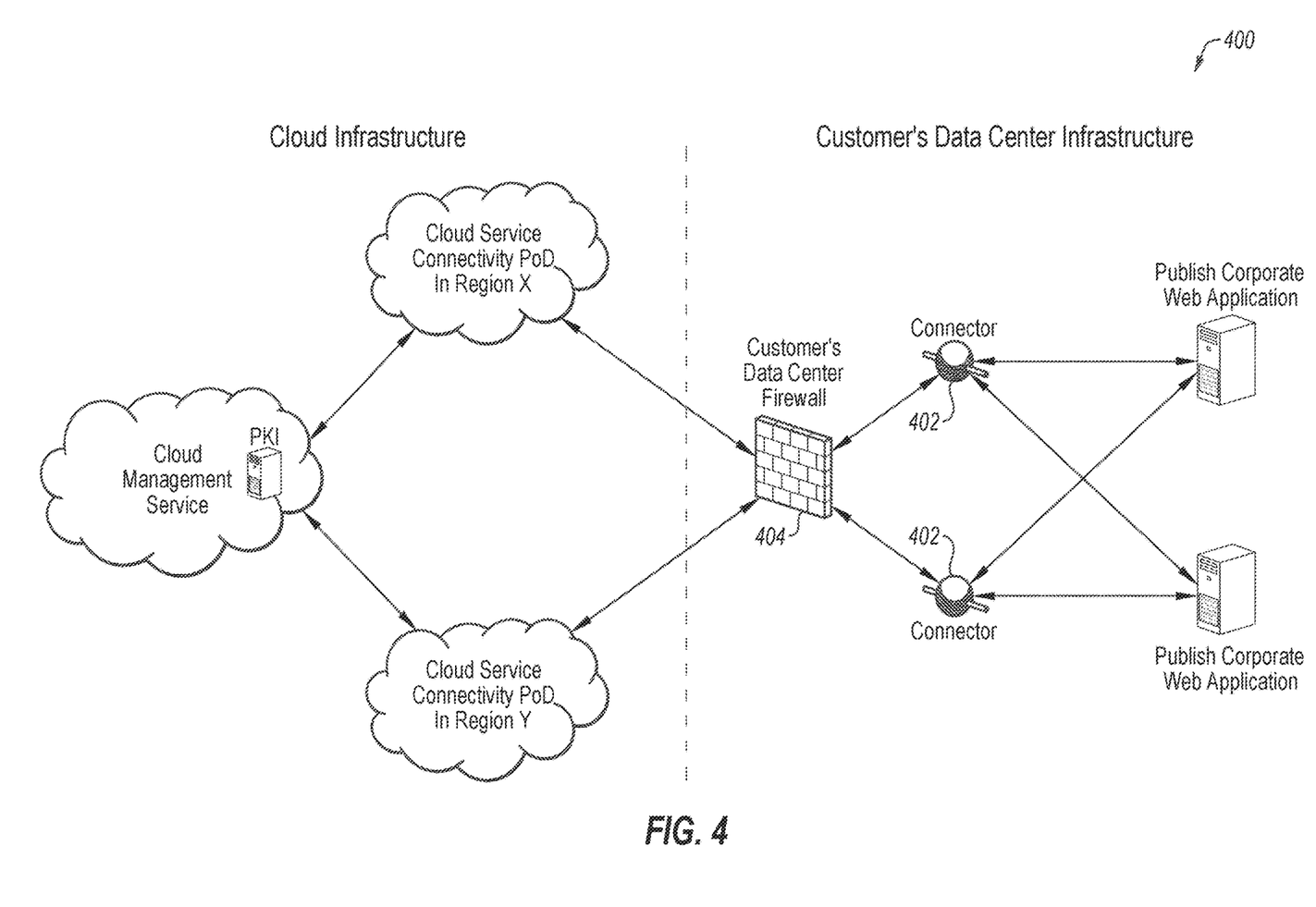
FIG. 4 illustrates an example communication scheme.

Layer 5 of FIG. 2 is a connectivity layer. The connectivity between the connectors 208 and the secure access cloud PoDs 206 may be performed via outgoing connections (e.g., from the connectors 208 that are deployed inside the corporate datacenters 212 behind firewall 214), such as over TCP Port 443 to the secure access cloud PoD 206. Minimizing the number of ports services used and reducing (e.g., to zero) the number of required changes in the existing perimeter security policies deployed in the corporate datacenters 212 may result in relatively fast deployment of the service, Each connector 208 may open a number of persistent communication channels to one or more secure access cloud PoD 206, and the connector 208 might open/close connections based on the configured applications and the load on those applications (e.g., elasticity based). FIG. 4 illustrates an example communication scheme 400. In particular, FIG. 4 illustrates various technical details of the communications between the connectors 402 (e.g., which may be deployed in physical or virtual datacenters hosting applications) and the secure access cloud PoDs. As illustrated in FIG. 4. the communications between the connectors and the secure access cloud PoDs may be carried out over TCP Port 443 and may be initiated by the connectors 402. The datacenter's firewall 404 may be required to allow outbound communication on this port to secure access cloud destinations. The outbound connections may be carried out with a binary protocol. The connections may be long-term/persistent, but if they are terminated, the connector 402 may attempt to recreate them as quickly as possible. The connections may be secured using TLS with both sides authenticating each other (including certificate pinning) as follows:

Secure Cloud Service—Each PoD (e.g., each component that terminates TLS inside each PoD) may have ephemeral certificates that are allocated by a dynamic PKI. The connector may be capable of checking the validity of these certificates to make sure that it is communicating directly with the secure cloud service.

Connector—When initiated, each connector 402 may receive an ephemeral One Time Password/Token (OTP), allowing it to establish initial communications with the secure cloud service and pull a TLS certificate. From this point, every communication between the connector 402 and the secure cloud service may be done with the certificate, including pulling new certificates (e.g., rotation of certificates). The secure cloud service may perform a strong pinning of each new certificate for each connector 402, monitor anomalies regarding e usage of various client certificates, and/or enforce strong segmentation access to data and services based on the presented client certificate of a connector 402.

The above scheme may ensure that the connectivity between the connector 402 and the secure cloud service is carried out with the highest level of security, using the most up-to-date cipher suites and without any inspection. in the middle. In cases where a TLS inspection of all traffic going from a data center to Internet services is required, trust can he established by connectors 402, cloud service PoDs, and a TLS-intercepting Secure Web Gateway/Proxy.

Layer 6 of FIG. 2 is a connector layer. Connectors 208 may be lightweight software agents that are deployed in the corporate datacenters 212 (which may be physical or virtual). Connectors 208 may help implement network access isolation required by the Zero Trust Access model, by opening outbound communication channels to the secure access cloud PoDs 206 and brokering the requests from accessing parties to the corporate applications 216, services 218, and workloads 220. Connectors 208 may be cloud-native resilient and scalable components, and may be distributed as Docker Containers, as well as using other means. Connectors 208 may be deployed on any physical or virtual server, as well as inside Container Orchestration environments including, but not limited to, Kubernetes, Amazon Elastic Container Service, Azure Container Instances, etc. Connectors 208 may support full high-availability and load-balancing and may scale horizontally to support a growing number of connections. Upon its creation, each connector 208 may be initiated with a unique One-Time Token.

Layer 7 of FIG. 2 is a connectivity to applications services layer. Connectivity between the connectors 208 and the corporate applications 216, services 218, and workloads 220 that are accessed via the secure access cloud PoDs 206 may take place inside the corporate datacenters 212. The number of connectors 208 in each corporate datacenter 212 may depend on the network segmentation strategy adopted by the organization using secure access cloud PoDs 206. The connectors 208 may be configured to be able to access the internal address of the configured resource via TCP/IP and, in relevant cases, UDP. Internal network segmentation strategies may be adopted that are targeted at preventing lateral movements resulting from potential application vulnerabilities. There may be no limitation on the number of connectors 208 that can be deployed in a single environment. Further, encrypted communications may be used inside the corporate datacenter 212. For example, when defining internal addresses for web applications or Representational State Transfer (REST)/Simple Object Access Protocol (SOAP) Application Programming Interface (API) endpoints, it may be preferable to use Hypertext Transfer Protocol Secure (HTTPS) over Hypertext Transfer Protocol (HITI)).

If an Enterprise Certificate Authority (CA) is used for internal HTTPS communications, trust may be configured between the Enterprise CA and the connectors 208. The connectors 208 deployed in the corporate datacenters 212 may open two types of secure MIPS connections, namely (1) connections with the secure access cloud PoDs 206, and (2) connections with internal corporate applications 216. Authentica Authentication for connectivity of type (1) may be carried out with certificates issued by Certificate Authorities (CAs) that can be recognized and validated by the connectors 208. One exception may be when dealing with authorized enterprise TLS-inspecting proxies deployed in the corporate datacenters 212. Authentication for connectivity of type (2) (e.g. connections with internal web servers deployed in the customers' datacenters 212 using TFTPS) can require the connector 208 to validate certificates that are either self-signed or are issued by a CA that is not generally recognizable. Self-signed certificates or CA root certificates for validating certificates issued by Enterprise CAs may be added to the list of trusted certificates for all the connectors 208 running in the relevant corporate datacenters 212.

Figure 5:
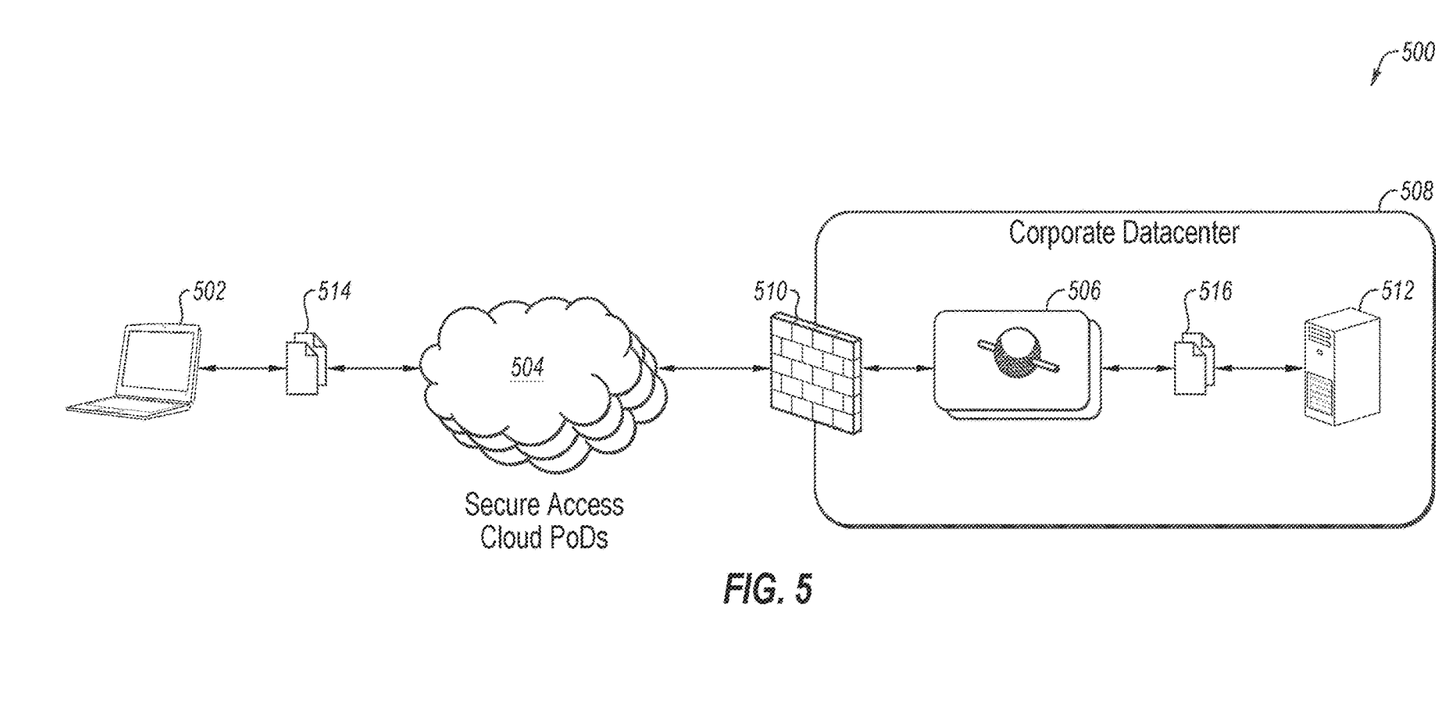
FIG. 5 illustrates a system for the translation of domain names performed in transit.

FIG. 5 illustrates a system 500 for the translation of domain names performed in transit. As disclosed in FIG. 5, the system 500 may include a client 502, secure access cloud PoDs 504, connectors 506 that are deployed inside a corporate datacenter 508 behind a firewall 510, and a web application server 512 inside the corporate datacenter 508. In some embodiments, the system 500 may also include quests/responses 514 and requests/responses 516, both containing headers and bodies. The requests/responses 514 may contain external addresses. In contrast, the requests/responses 516 may contain internal addresses.

In particular, in responses received from the web application server 512, all internal addresses in the headers and bodies of the responses 514 and 516 may be replaced with external addresses. Then, requests sent to the web application server 512, a web browser on the client 502 may use the external address both in the headers and in the bodies of the requests 514 and 516.

In certain scenarios, when providing access to the web application server 512 (e.g., which may represent web application service resources) via the secure access cloud PoDs 504, the domain name of a resource being accessed play be different from its "previous" state, where the resource was open via a network access (e.g., inside the corporate datacenter 508, or via VPN solutions). Three frequent reasons for this situation are s follows. First, use of a secure access cloud subdomain as a DNS for the resources (e.g., application1.company.luminatesec.com), instead of its internal domain name (e.g., application1.myinternaldomain.com). Second, asymmetric access to a corporate resource (e.g., internal entities inside the network accessing via an internal domain name, while remote entities accessing using a different domain name). Third, a web application having either a configuration specifying its expected domain name or a hard-coded domain name in its HTML, JavaScript, or other resource.

While it may be desirable to use custom domains with web applications in order to ensure their proper functioning in all cases, situations where this would not be possible may exist, requiring translation of domain names to be performed "in transit" by the secure access cloud PoDs 504. The system 500 of FIG. 5 illustrates this environment architecture. The secure access cloud PoDs 504 may strive to make all translations, when required, completely transparent. For edge cases, a manual link translation capability may be provided.

Automatic internal-external addresses translation may include automatic translation of all occurrences of an internal address (e.g., as defined in the web application object in a secure access cloud Admin Portal) to an external address, and Wray be performed on most prominent content types and relevant headers. In some embodiments, this automatic content translation mechanism may work automatically both on each HTTP Header in requests and responses, as well as on each HTTP Body in both directions, and in its ability to work on a chunked stream. In some embodiments, a virtual window of content is created (independent of how it is being split into chunks) and searches/replaces the data while reconstructing the chunks.

Figure 6:
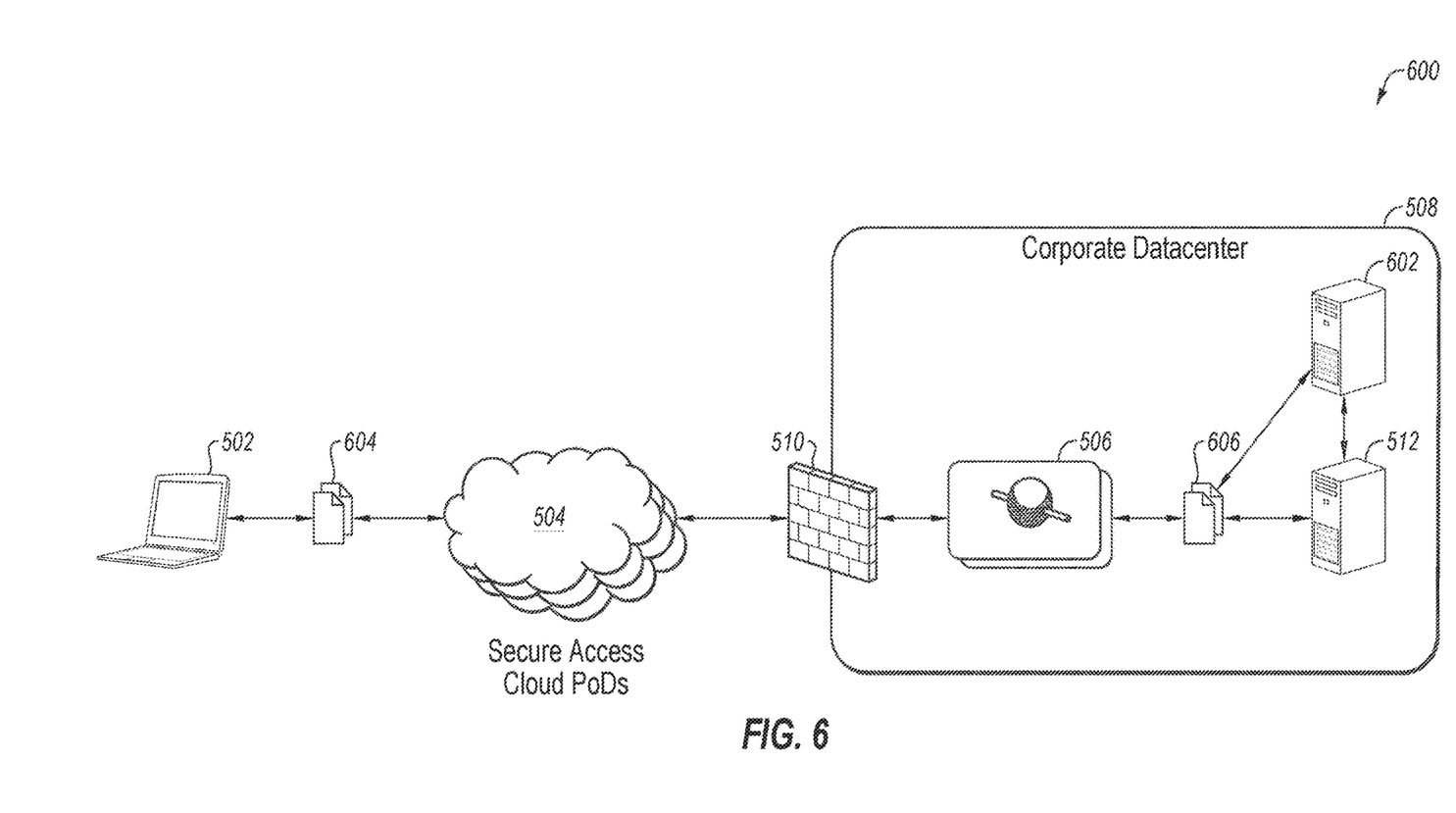
FIG. 6 illustrates a system for a linked application feature.

FIG. 6 illustrates a system 600 for a linked application feature. As disclosed in a comparison of FIGS. 5 and 6, the system 600 of FIG. 6 is similar to the system 500 of FIG. 5, except that the system 600 includes a second web application server 602, and includes different requests/responses 604 and 606. In particular, the requests/responses 604 from the first web application server 512 may contain an external domain of the second web application server 602 in a reference to a resource hosted on the second web application server 602. Conversely, the requests/responses 606 from the first web application server 512 may contain an internal domain of the second web application server 602 in a reference to a resource hosted on the second web application server 602.

In some cases, internal web applications may contain resources that reference different internal web applications/resources by their internal domain names. When providing Zero Trust Access to such resources, everything that may be accessed may be configured with secure access cloud PoDs 504. A linked application feature may provide automatic address translation for such cases. In order for this type of automatic address translation rules to work, an administrator may define "Linked Applications" in an Administration Portal (signaling that resources from the first web application server 512 could contain references to resources from the second web application server 602, and vice-versa). Access permissions to both web application servers 512 and 602 may be aligned, in order to ensure smooth usage.

In some embodiments, when addressing the situation where one web server contains references to resources located inside another web server, there may be a desire to mask the fact that multiple web servers exist. Some embodiments may allow automatic masking of the existence of additional web servers by generating ad-hoc Unique Resource Identifiers (URIs) for referenced resources that appear (to the client 502) to be served by the original server, whereas in reality they are served by a different server. With reference again to the system 600 of FIG. 6, a resource downloaded from the first web application server 512 may contain a reference to another resource located at the second web application server 602 (e.g., https://web-application-server-2-address/referenced-resource-location). The system 600 may contain an automatic mechanism that, when enabled, can identify such resources, and automatically modify the reference in the content (and metadata) delivered to the client 502 (e.g., to https://web-application-server-1-facade-address/masked-resources-for-web-application-server-2/referenced-resource-location). When a client 502 (e.g., a web browser or other client) tries to access the resource using the masked URL as shown above, a mechanism inside the secure access cloud PoD 504 may identify this and, instead of forwarding the request to first web application server 512, may forward the request to the second web application server 602, converting the masked resource location to the location of the actual resource on the second web application server 602. All of this ray happen transparently, without any knowledge of the client 502 regarding the whereabouts of the resource. It is understood that this may not impair or contradict in any way access policies and cross-object resource sharing policies implemented by the web application servers 512 and 602.

Figure 7:
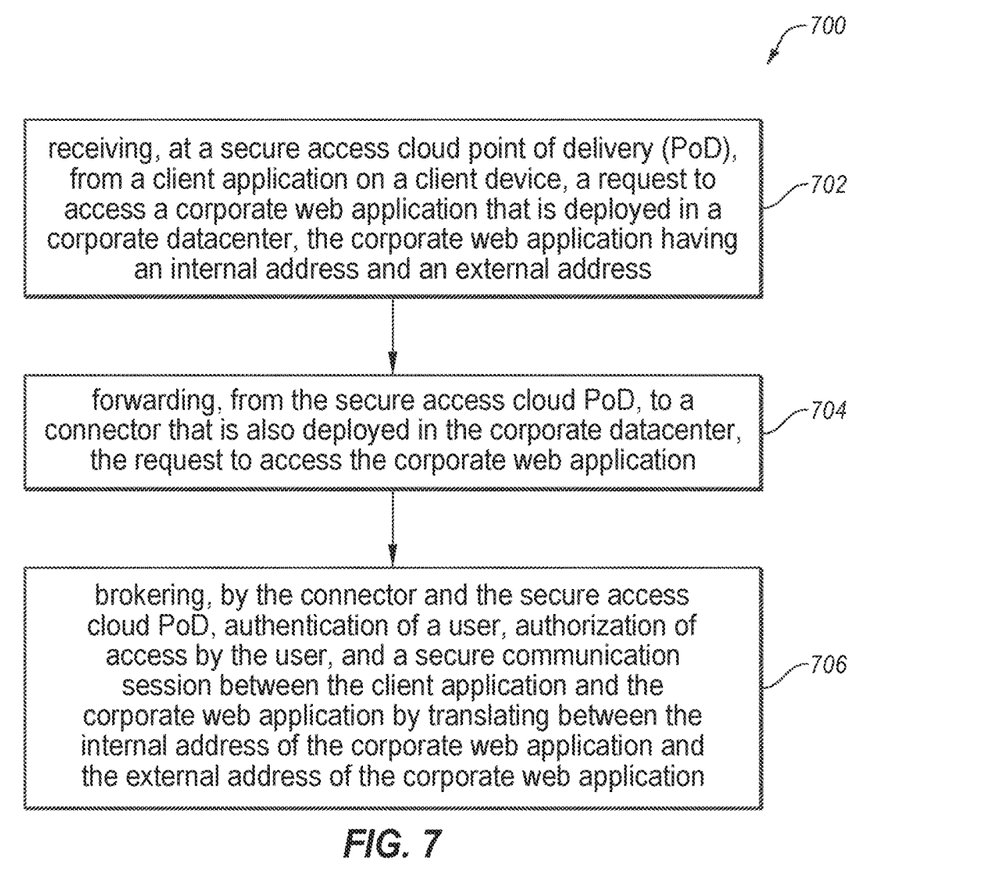
FIG. 7 is a flowchart of an example method for secure access to a corporate web application with translation between an internal and external address.

FIG. 7 is a flowchart of an example method 700 for secure access to a corporate web application with translation between an internal and external address. The method 700 may be performed, in some embodiments, by a device or system, such as by a connector (e.g., the connector 506 of FIG. 5) deployed inside a corporate datacenter (which may be physical or virtual), a cloud service Point of Delivery (PoD) (e.g., the secure access cloud PoD 504 of FIG. 5), corporate resource (e.g., the web application server 512 of FIG. 5), and/or a user device the client 502 of FIG. 5) or associated applications thereof. In these and other embodiments, the method 700 may be performed by one or yore processors based on one or more computer-readable instructions stored on one or lore non-transitory computer-readable media. The method 700 will now be described in connection with FIGS. 1-7.

The method 700 may include, at action 702, receiving, at a secure access cloud point of delivery (PoD), from a client application on a client device, a request to access a corporate web application that is deployed in a corporate datacenter, the corporate web application having an internal address and an external address. For example, a client application on the client 502 may send and the secure access cloud PoD 504 may receive, at action 702, a request to access a corporate web application on the web application server 512 that is deployed in a corporate datacenter 508. The corporate web application may have an internal address and an external address.

The method 700 may include, at action 704, forwarding, from the secure access cloud PoD, to a connector that is also deployed in the corporate datacenter, the request to access the corporate web application. For example, the secure access cloud PoD 504 may forward, at action 704, the request to access the corporate web application on the web application server 512 to the connector 506 that is also deployed in the corporate datacenter 508.

The method 700 may include, at action 706, brokering, by the connector and the secure access cloud PoD, authentication of a user, authorization of access by the user, and a secure communication session between the client application and the corporate web application by translating between the internal address of the corporate web application and the external address of the corporate web application. in some embodiments, this brokering may occur with no corresponding agent being installed at the client device, and with the client application being unaware that the secure communication session is brokered by the connector and the secure access cloud PoD. For example, the connector 506 and the secure access cloud PoD 504 may broker, at action 706, authentication of a user, authorization of access by the user, and a secure communication session between the client application on the client 502 and the corporate web application on the web application server 512. In this example, the brokering at action 706 may occur with no corresponding agent being installed at the client 502, and with the client application on the client 502 being unaware that the secure communication session is brokered by the connector 506 and the secure access cloud PoD 504.

Also, in this example, the brokering at action 706 of the secure communication session between the client application on the client 502 and the corporate web application on the web application server 512 may include translating between the internal address of the corporate web application and the external address of the corporate web application. In some embodiments, the translating between the internal address of the corporate web application and the external address of the corporate web application may be performed in request headers and bodies by replacing the external address of the corporate web application with the internal address of the corporate web application. In some embodiments, the translating between the internal address of the corporate web application and the external address of the corporate web application may be performed in response headers and bodies by replacing the internal address of the corporate web application with the external address of the corporate web application. In some embodiments, the translating between the internal address of the corporate web application and the external address of the corporate web application may he completely transparent to the client application and/or to the corporate web application, and/or may he performed automatically. In some embodiments, the translating between the internal address of the corporate web application and the external address of the corporate web application may be performed on a chunked stream. In these embodiments, the translating between the internal address of the corporate web application and the external address of the corporate web application performed on the chunked stream may employ a virtual window of content with searches and replaces of the internal address and the external address being performed while reconstructing chunks in the chunked stream.

Also, in this example, the brokering at action 706 of the secure communication session between the client application on the client 502 and the corporate web application on the web application server 512 may include linking to a second corporate web application on the second web application server 602 that is referenced by an internal domain of the second corporate web application in the first corporate web application. In some embodiments, the linking to the second corporate web application that is referenced by the internal domain of the second corporate web application in the first corporate web application may include automatically translating the internal domain of the second corporate web application to an external domain of the second corporate web application in response headers and bodies, and/or automatically translating the internal domain of the second corporate web application to an external domain of the second corporate web application in request headers and bodies. In some embodiments, access permissions to both the first corporate web application and the second corporate web application may be aligned. In some embodiments, the linking to the second corporate web application that is referenced by the internal domain of the second corporate web application in the first corporate web application may include automatically masking the existence of the second corporate web application from the client application. In these embodiments, the automatically masking the existence of the second corporate web application from the client application may include generating, by the secure access cloud PoD, ad-hoc Unique Resource Identifiers (URIs) for the second corporate web application that appear to the client application to correspond to the first corporate web application. In these embodiments, the URIs may appear in content and/or metadata delivered to the client application. In these embodiments, the automatically masking the existence of the second corporate web application from the client application may be completely transparent to the client application.

The method 700 may thus be employed, in some embodiments, to accomplish secure access to one or more corporate web applications with translation between one or more internal and external addresses. Although the actions of the method 700 are illustrated in FIG. 7 as discrete actions, various actions may be divided into additional actions, combined into fewer actions, reordered, expanded, or eliminated, depending on the desired implementation.

Further, it is understood that the method 700 may improve the functioning of a computer system itself, and improve the technical field of secure communication sessions. For example, the functioning of the first web application server 512 and/or the second web application server 602 may be improved by the method 700 due to a client application on the client 502 being granted secure access to one or more corporate web applications on the first web application server 512 and/or the second web application server 602 by the brokering of a secure communication session by the secure access cloud PoD 504 and the connector 506. Further, this may be accomplished with no corresponding agent being installed at the client 502, and with the client application at the client 502 being unaware that the secure communication session is brokered by the connector 506 and the secure access cloud PoD 504, unlike conventional VPN software which generally requires an agent to be installed on the client.

Figure 8:
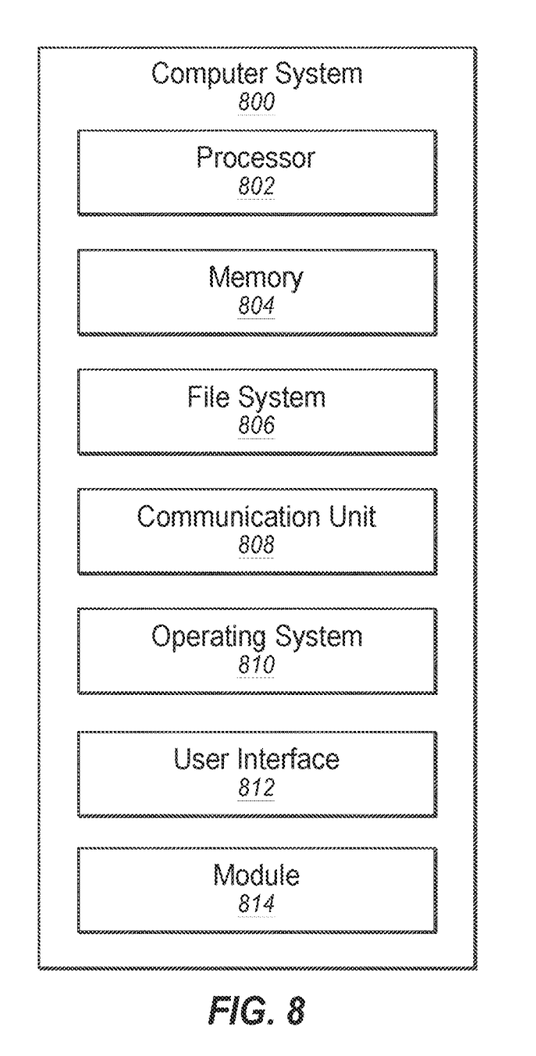
FIG. 8 illustrates an example computer system that may be employed in secure access to a corporate web application with translation between an internal and external address.

FIG. 8 illustrates an example computer system 800 that may be employed in providing secure access to a corporate web application with translation between an internal address and an external address. In some embodiments, the computer system 800 may be part of any of the systems or devices described in this disclosure. For example, the computer system 800 may be part of any client, server, cloud service, firewall, connector, web application, or resource of FIGS. 1-6.

The computer system 800 may include a processor 802, a memory 804, a file system 806, a communication unit 808, an operating system 810, a user interface 812, and a module 814, which all may be communicatively coupled. In some embodiments, the computer system may be, for example, a desktop computer, a client computer, a server computer, a workstation computer, a mobile phone, a laptop computer, a smartphone, a smartwatch, a tablet computer, a portable music player, or any other computer system.

Generally, the processor 802 may include any suitable special-purpose or general-purpose computer, computing entity, or processing device including various computer hardware or software applications and may be configured to execute instructions stored on any applicable computer-readable storage media. For e ample, the processor 802 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 802 may interpret and/or execute program instructions and/or process data stored in the memory 804 and/or the file system 806. In some embodiments, the processor 802 may fetch program instructions from the file system 806 and load the program instructions into the memory 804. After the program instructions are loaded into the memory 804, the processor 802 may execute the program instructions. In some embodiments, the instructions may include the processor 802 performing one or more steps of the processes disclosed herein.

The memory 804 and the file system 806 may include computer-readable storage media for carrying having stored thereon computer-executable instructions or data structures. Such computer-readable storage media may he any available non-transitory media that may be accessed by a general-purpose or special-purpose computer, such as the processor 802. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 802 to perform a certain operation or group of operations, such as one or more steps of the processes disclosed herein. These computer-executable instructions may be included, for example, in the operating system 810, in one or more modules, such as the module 814, or in some combination thereof.

The communication unit 808 may include any component, device, system, or combination thereof configured to transmit or receive information over a network. In some embodiments, the communication unit 808 may communicate with other devices at other locations, the same location, or even other components within the same system. For example, the communication unit 808 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 808 may permit data to be exchanged with a network and/or any other devices or systems, such as those described in the present disclosure.

The operating system 810 may be configured to manage hardware and software resources of the computer system 800 and configured to provide common services for the computer system 800.

The user interface 812 may include any device configured to allow a user to interface with the computer system 800. For example, the user interface 812 may include a display, such as an LCD, LED, or other display, that is configured to present video, text, application user interfaces, and other data as directed by the processor 802. The user interface 812 may further include a louse, a track pad, a keyboard, a touchscreen, volume controls, other buttons, a speaker, a microphone, a camera, any peripheral device, or other input or output device. The user interface 812 may receive input from a user and provide the input to the processor 802. Similarly, the user interface 812 may present output to a user.

The module 814 may be one or more computer-readable instructions stored on one or more non-transitory computer-readable media, such as the memory 804 or the file system 806, that, when executed by the processor 802, is configured to perform one or more steps of the processes disclosed herein. In some embodiments, the module 814 may be part of the operating system 810 or may be part of an application of the computer system 800, or may be some combination thereof. In some embodiments, the module 814 may function as any software component disclosed herein.

Modifications, additions, or omissions may be made to the computer system 800 without departing from the scope of the present disclosure. For example, although each is illustrated as a single component FIG. 8, any of the components 802-814 of the computer system 800 may include multiple similar components that function collectively and are communicatively coupled. Further, although illustrated as a single computer system, it is understood that the computer system 800 may include multiple physical or virtual computer systems that are networked together, such as in a cloud computing environment, a multitenancy environment, or a virtualization environment.

As indicated above, the embodiments described herein may include, the use of a special purpose or general purpose computer (e.g., the processor 802 of FIG. 8) including various computer hardware or software applications, as discussed in greater detail below. Further, as indicated above, embodiments described herein may be implemented using computer-readable media (e.g., the memory 804 or file system 806 of FIG. 8) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation too such intent is present. For example, as an aid to understanding, the following appended claims may contain usage of the introductory phrases "at east one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description claims, or drawings, should be understood to contemplate the possibilities of including one of the terms, either of the terms, or both terms. For example, the phrase "A or B" should be understood to include the possibilities of "A" or "B" or "A and B."

Additionlly, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third." etc., connote a specific number of elegy dents, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

What is claimed is:

1. A computer-implemented method comprising:
receiving, at a secure access cloud point of delivery (PoD), from a client application on a client device, a request to access a corporate web application that is deployed in a corporate datacenter, wherein the secure access cloud PoD is deployed outside of the corporate datacenter;
brokering, by a connector deployed in the corporate datacenter and the secure access cloud PoD, a secure communication session between the client application and the corporate web application, wherein brokering the secure communication session further comprises translating between an internal address of the corporate web application and an external address of the corporate web application, wherein communication from the client application addressed to the external address of the corporate web application is translated, via the secure access cloud PoD, to the internal address of the corporate web application, wherein the client application is unaware that the secure communication session is brokered by the connector and the secure access cloud PoD.

2. The method of claim 1, wherein the translating between the internal address of the corporate web application and the external address of the corporate web application is performed in request headers by replacing the external address of the corporate web application with the internal address of the corporate web application.

3. The method of claim 1, wherein the translating between the internal address of the corporate web application and the external address of the corporate web application is performed in request bodies by replacing the external address of the corporate web application with the internal address of the corporate web application.

4. The method of claim 1, wherein the translating between the internal address of the corporate web application and the external address of the corporate web application is performed in response headers by replacing the internal address of the corporate web application with the external address of the corporate web application.

5. The method of claim 1, wherein the translating between the internal address of the corporate web application and the external address of the corporate web application is performed in response bodies by replacing the internal address of the corporate web application with the external address of the corporate web application.

6. The method of claim 1, wherein the translating between the internal address of the corporate web application and the external address of the corporate web application is completely transparent to the client application.

7. The method of claim 1, wherein the translating between the internal address of the corporate web application and the external address of the corporate web application is completely transparent to the corporate web application.

8. The method of claim 1, wherein the translating between the internal address of the corporate web application and the external address of the corporate web application is performed automatically.

9. The method of claim 1, wherein the translating between the internal address of the corporate web application and the external address of the corporate web application is performed on a chunked stream.

10. The method of claim 9, wherein the translating between the internal address of the corporate web application and the external address of the corporate web application performed on the chunked stream employs a virtual window of content with searches and replaces of the internal address and the external address being performed while reconstructing chunks in the chunked stream.

11. A computer-implemented method comprising:
receiving, at a secure access cloud point of delivery (PoD), from a client application on a client device, a request to access a first corporate web application that is deployed in a corporate datacenter;
brokering, by a connector deployed in the corporate data center and the secure access cloud PoD, a secure communication session between the client application and the first corporate web application, wherein the client application is unaware that the secure communication session is brokered by the connector and the secure access cloud PoD, wherein brokering the secure communication session further comprises:
translating between an internal address of the corporate web application and an external address of the corporate web application, wherein communication from the client application addressed to the external address of the first corporate web application is translated, via the secure access cloud PoD, to the internal address of the first corporate web application; and
linking to a second corporate web application that is referenced by an internal domain of the second corporate web application in the first corporate web application.

12. The method of claim 11, wherein the translating between the internal address of the corporate web application and the external address of the corporate web application is performed:
in request headers and bodies by replacing the external address of the corporate web application with the internal address of the corporate web application; and
in response headers and bodies by replacing the internal address of the corporate web application with the external address of the corporate web application.

13. The method of claim 11, wherein the translating between the internal address of the corporate web application and the external address of the corporate web application is completely transparent to the client application and to the corporate web application.

14. The method of claim 11, wherein the linking to the second corporate web application that is referenced by the internal domain of the second corporate web application in the first corporate web application comprises automatically translating the internal domain of the second corporate web application to an external domain of the second corporate web application in response headers and bodies.

15. The method of claim 11, wherein the linking to the second corporate web application that is referenced by the internal domain of the second corporate web application in the first corporate web application comprises automatically translating the internal domain of the second corporate web application to an external domain of the second corporate web application in request headers and bodies.

16. The method of claim 11, wherein access permissions to both the first corporate web application and the second corporate web application are aligned.

17. The method of claim 11, wherein the linking to the second corporate web application that is referenced by the internal domain of the second corporate web application in the first corporate web application comprises automatically masking the existence of the second corporate web application from the client application.

18. The method of claim 17, wherein the automatically masking the existence of the second corporate web application from the client application comprises generating, by the secure access cloud PoD, ad-hoc Unique Resource Identifiers (URIs) for the second corporate web application that appear to the client application to correspond to the first corporate web application.

19. The method of claim 18, wherein the URIs appear in content and/or metadata delivered to the client application.

20. The method of claim 17, wherein the automatically masking the existence of the second corporate web application from the client application is completely transparent to the client application.

* * * * *